US011977396B2

(12) United States Patent
Wei et al.

(10) Patent No.: US 11,977,396 B2
(45) Date of Patent: May 7, 2024

(54) MULTI-BODY FORMATION RECONSTRUCTION METHOD FOR UNMANNED DEVICE CLUSTER CONTROL

(71) Applicant: NANJING UNIVERSITY OF AERONAUTICS AND ASTRONAUTICS, Nanjing (CN)

(72) Inventors: Xiaohui Wei, Nanjing (CN); Wei Liao, Nanjing (CN); Xubo Li, Nanjing (CN); Tianchi Gao, Nanjing (CN); Long Li, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 482 days.

(21) Appl. No.: 17/287,527

(22) PCT Filed: Jun. 25, 2019

(86) PCT No.: PCT/CN2019/092627
§ 371 (c)(1),
(2) Date: Apr. 22, 2021

(87) PCT Pub. No.: WO2020/082768
PCT Pub. Date: Apr. 30, 2020

(65) Prior Publication Data
US 2021/0349477 A1    Nov. 11, 2021

(30) Foreign Application Priority Data
Oct. 22, 2018    (CN) .......................... 201811229466.3

(51) Int. Cl.
*G05D 1/00*    (2006.01)
*G06F 18/2321*    (2023.01)
*G06N 7/01*    (2023.01)

(52) U.S. Cl.
CPC ......... *G05D 1/104* (2013.01); *G06F 18/2321* (2023.01); *G06N 7/01* (2023.01)

(58) Field of Classification Search
CPC ....... G05D 1/104; G06N 7/01; G06F 18/2321
See application file for complete search history.

(56) References Cited

FOREIGN PATENT DOCUMENTS

CN    109472064 B  *  5/2023  ............. G05D 1/104

OTHER PUBLICATIONS

Cofta et al, "Cross-Entropy as a Metric for the Robustness of Drone Swarms", May 27, 2020, MDPI, (Year: 2020).*

(Continued)

*Primary Examiner* — Navid Z. Mehdizadeh
*Assistant Examiner* — Kenneth M Dunne
(74) *Attorney, Agent, or Firm* — PROI Intellectual Property US; Klaus Michael Schmid (57) ABSTRACT

The present invention relates to a multi-body formation reconstruction method for an unmanned device cluster control. The present invention comprises: step 1: reading a preset target formation; step 2: establishing a probability density function associated with the target formation; step 3: obtaining the current formation of all the controlled objects in the unmanned device cluster, and establishing a probability density function associated with the current formation; step 4: decreasing a cross entropy by adjusting the position of the controlled objects in the unmanned device cluster, and repeating executing the step 3 and the step 4 until the formation composed by the controlled objects in the unmanned device cluster is consistent with the target formation.

3 Claims, 6 Drawing Sheets

(56) References Cited

OTHER PUBLICATIONS

Machine translation of CN 109472064 B (Year: 2023).*
Olivares-Mendez et al, "Using the Cross-Entropy Method for Control Optimization: A Case Study of See- and-Avoid on Unmanned Aerial Vehicles", 2014, IEEE (Year: 2014).*

* cited by examiner

MULTI-BODY FORMATION RECONSTRUCTION METHOD FOR UNMANNED DEVICE CLUSTER CONTROL

TECHNICAL FIELD

The present invention relates to the technical field of unmanned device cluster controls, and more particularly relates to a multi-body formation reconstruction method for an unmanned device cluster control.

BACKGROUND ART

In recent years, an unmanned device cluster technology has been tried to be applied in various fields, such as an unmanned aerial vehicle cluster, and the unmanned aerial vehicle cluster is more and more widely applied, especially applied in performance, transportation, reconnaissance, and other tasks more or less. In these tasks, arranging individuals in the cluster into specific formations is one of the key issues. With the increase of the number of the individuals in the cluster, the problem of formation reconstruction becomes more and more complex, mainly reflected in path planning, collision prevention and the like.

The formation reconstruction may be generally divided into three subtasks: firstly, controlling the formation of controlled objects to be converted into a target formation; secondly, keeping the formation stable to make it restorable automatically under disturbance; and thirdly, avoiding collisions during movement. At present, most of the existing formation reconstruction algorithms are based on a Leader-Follower mode, one leader needs to be determined in all the controlled objects, and other individuals serve as followers to follow the leader in some way. Still other algorithms are modified from the leader-follower mode, such as a mode of considering a formation structure as a Henneberg structure. All these algorithms need to make the positions in the formation correspond to the controlled objects one by one in advance, and then carry out path planning. Moreover, unmanned devices serving as the followers and the leader need to be set, and a path needs to be re-planned if the current formation is disturbed due to external interference in the task execution process.

In practical application, however, once the size of the cluster is too large, it is almost difficult to solve the problem that the current formation is disturbed due to external interference by real-time path re-planning. For example, in the formation performance of 1374 unmanned aerial vehicles held at Yongningmen, Xi'an city wall on May 1, 2018, significant errors occurred in the actual performance process. As a result, the unmanned aerial vehicles in the cluster dropped a lot. The causes of the accident were preliminarily identified as the situation that the unmanned aerial vehicles could not receive GPS signals due to interference or device failure, which caused the leader unmanned aerial vehicle to be out of control. The confusion of all directly or indirectly following unmanned aerial vehicles was caused because the existing control algorithm is difficult to deal with the interference operating condition.

SUMMARY OF THE INVENTION

An embodiment of the present invention provides a multi-body formation reconstruction method for an unmanned device cluster control, which can solve the problem of being difficult to deal with the interference operating condition in a control algorithm of a leader-follower mode at present.

In order to achieve the foregoing objective, the embodiment of the present invention adopts the following technical solutions:

Step 1: reading a preset target formation, the target formation being a set composed by coordinates of a specified number of points, the specified number being matched with the number of unmanned devices in the unmanned device cluster;

Step 2: establishing a probability density function P(x) associated with the target formation;

Step 3: obtaining the current formation of all the controlled objects in the unmanned device cluster, and establishing a probability density function Q(x) associated with the current formation;

Step 4: decreasing a cross entropy of P(x) and Q(x) by adjusting the position of the controlled objects in the unmanned device cluster; and repeating executing the step 3 and the step 4 until the formation composed by the controlled objects in the unmanned device cluster is consistent with the target formation.

According to the multi-body formation reconstruction algorithm provided by the present embodiment, flight is calculated and a flight formation of a cluster is adjusted in real time, a one-to-one correspondence relationship between the position in the formation and controlled objects is not required to be established in advance, path planning is not required to be carried out in advance, the controlled objects are not required to be divided into a leader and followers, and no collision occurs when each individual moves according to an instruction generated by the algorithm. Therefore, the problem of being difficult to deal with the interference operating condition in the control algorithm of the leader-follower mode at present is reduced.

BRIEF DESCRIPTION OF THE DRAWINGS

In order to more clearly illustrate the technical solutions of the embodiments of the present invention, the drawings need to be used in the embodiments are briefly described below, and it is obvious that the drawings in the description below are only some embodiments of the present invention, and a person of ordinary skill in the art can obtain other drawings from these drawings without any creative effort.

DETAILED DESCRIPTION OF THE INVENTION

In order to make those skilled in the art better understand the technical solutions of the present invention, the present invention will be described in further detail with reference to the accompanying drawings and specific implementations. Hereinafter, the implementations of the present invention will be described in detail, examples of the implementations are illustrated in the accompanying drawings, wherein the same or similar reference numerals throughout refer to the same or similar elements or elements having the same or similar functions. The implementations described below by reference to the accompanying drawings are exemplary only for the purpose of illustrating the present invention and are not to be construed as limiting the present invention. Those skilled in the art can understand that, as used herein, the singular forms "a", "an", "the" and "this" may include the plural forms as well, unless expressly stated otherwise. It should be further understood that the terms "include/comprise" when used in the description of the present invention, specify the presence of stated features, integers, steps, operations, elements and/or components, but do not preclude the presence or addition of one or more other features, integers, steps, operations, elements, components and/or combinations thereof. It should be understood that when an element is referred to as being "connected" or "coupled" to another element, it may be directly connected or coupled to other elements or intermediate elements may also be present. Furthermore, "connected" or "coupled" as used herein may include wirelessly connected or coupled. As used herein, the terms "and/or" include any unit and all combinations of one or more of the associated listed items. Those skilled in the art can understand that, all terms (including technical and scientific terms) used herein have the same meaning as commonly understood by those of ordinary skill in the art to which the present invention belongs, unless otherwise defined. It should also be understood that terms, such as those defined in general-purpose dictionaries, should be interpreted as having a meaning that is consistent with their meaning in the context of the prior art, and will not be interpreted in an idealized or overly formal sense unless defined as herein.

Figure 6:
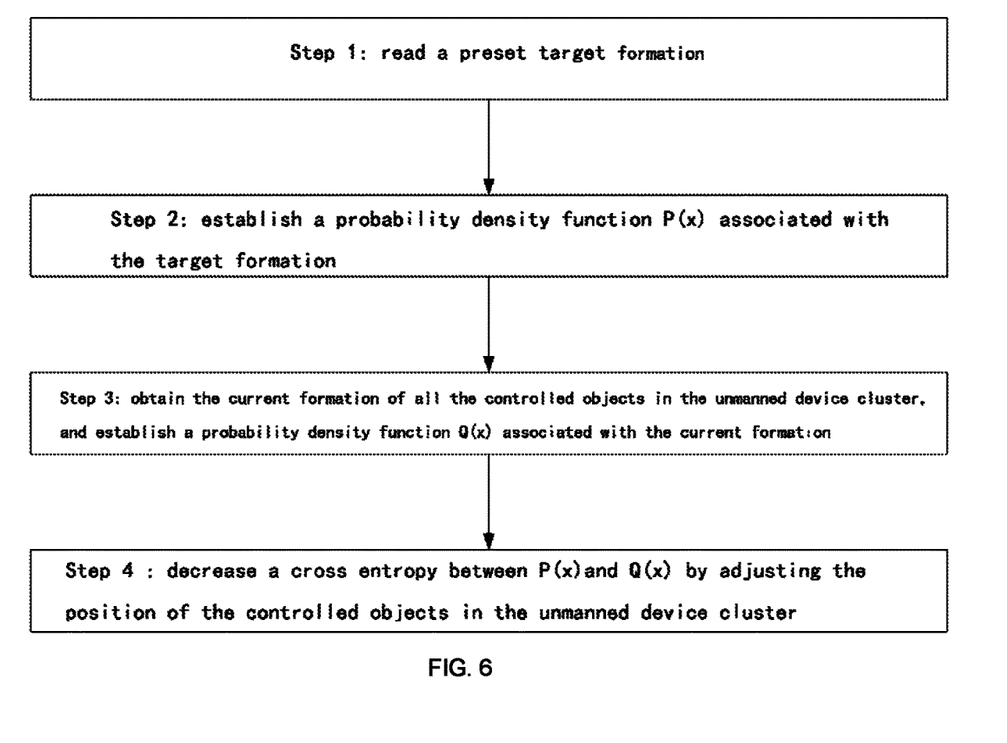
FIG. 6 is a flowchart of a method provided in an embodiment of the present invention.

The embodiment of the present invention provides a multi-body formation reconstruction method for an unmanned device cluster control. As shown in FIG. 6, the method includes:

Step 1: Read a preset target formation.

The target formation is a set composed by coordinates of a specified number of points, and the specified number is matched with the number of unmanned devices in the unmanned device cluster.

Step 2: Establish a probability density function $P(x)$ associated with the target formation.

Step 3: Obtain the current formation of all the controlled objects in the unmanned device cluster, and establish a probability density function $Q(x)$ associated with the current formation.

Step 4: Decrease a cross entropy of $P(x)$ and $Q(x)$ by adjusting the position of the controlled objects in the unmanned device cluster.

The step 3 and the step 4 are executed repeatedly until the formation composed by the controlled objects in the unmanned device cluster is consistent with the target formation.

In the present embodiment, the specific manner of reading the preset target formation in the step 1 includes:

A set $[X_i]$ of coordinates of respective points in the target formation is obtained.

Elements in $[X_i]$ represent target positions of the respective points in the target formation, $i=1, 2, \ldots, N$, the points in the target formation are represented as $X_i=[X^j_i]$, $X^j_i$ represents the $j^{th}$ component of the coordinate of the $i^{th}$ target position, $j=1, \ldots n$, n represents the dimensions of a space where the target formation is located, and n has a value of 2 or 3.

In the present embodiment, the specific manner of establishing the probability density function $P(x)$ associated with the target formation in the step 2 includes:

A multivariate normal distribution $P_i(x)$ with $X_i$ as the mean value is determined, wherein $$P_i(x) = \frac{1}{\left(\sqrt{2\pi}\right)^n \sigma^n} \exp\left[-\frac{1}{2}\sum_{j=1}^n \left(\frac{x^j_i - x^j}{\sigma}\right)^2\right]$$

The probability density function $P(x)$ associated with the target formation is established, wherein $$P(x) = \frac{1}{N}\sum_{i=1}^N P_i(x), x = \{x^j\}, j = 1, \ldots, n,$$

N represents the number of the controlled objects, and $\sigma$ represents a standard deviation of the normal distribution.

Since $P_i(x)$ is a function built in an n-dimensional space, the independent variable x has n components, $x^i$ represents the $j^{th}$ component of x, x is a formal parameter, for example, $f(x)=x+1$ commonly represents a function of x, where x is a formal parameter, then $f(y)=y+1$, and the meaning of the function f is invariant regardless of the letter with which the formal parameter is replaced.

The final probability density function $P(x)$ may be represented as:

$$P(x) = \frac{1}{N}\sum_{i=1}^N \frac{1}{\left(\sqrt{2\pi}\right)^n \sigma^n} \exp\left[-\frac{1}{2}\sum_{j=1}^n \left(\frac{x^j_i - x^j}{\sigma}\right)^2\right]$$

$P_i(x)$ is the probability density function of a multivariate normal distribution, and the mean value of the multivariate normal distribution is $(X^1_i, \ldots, X^n_i)$, the standard deviation is $\sigma$, where x refers to an element in a set $(x^1, \ldots, x^n)$, i.e. $P_i(x)$ is expressed as $P_i(x^1, \ldots x^n)$.

In the present embodiment, the specific manner of establishing the probability density function $Q(x)$ associated with the current formation in the step 3 includes:

A set $[Y_i]$ of coordinates of all the controlled objects in the current formation is obtained, wherein $Y_i=[Y^j_i]$, and $Y^j_i$ represents the $j^{th}$ component of the coordinate of the $i^{th}$ controlled object position in the current formation.

A multivariate normal distribution $Q_i(x)$ with $Y^j_i$ as the mean value is determined, wherein $$Q_i(x) = \frac{1}{\left(\sqrt{2\pi}\right)^n \sigma^n} \exp\left[-\frac{1}{2}\sum_{j=1}^n \left(\frac{Y^j_i - x^j}{\sigma}\right)^2\right]$$

The probability density function $Q(x)$ associated with the current formation is established, wherein $$Q(x) = \frac{1}{N}\sum_{i=1}^N Q_i(x), x = \{x^j\}, j = 1, \ldots, n,$$

N represents the number of the controlled objects, and $\sigma$ represents a standard deviation of the normal distribution.

The final Q(x) may be represented as:

$$Q(x) = \frac{1}{N}\sum_{i=1}^{N}\frac{1}{(\sqrt{2\pi})^n \sigma^n}\exp\left[-\frac{1}{2}\sum_{j=1}^{n}\left(\frac{Y_i^j - x^j}{\sigma}\right)^2\right]$$

$Q_i(x)$ is an n-ary normal distribution probability density function with Yi as the mean value and $\sigma$ as the standard deviation, the independent variable x has n components, and $x^j$ represents the $j^{th}$ component of x. $Y_i=[Y_i^j]$, $Y_i^j$ represents the $j^{th}$ component of the coordinate of the $i^{th}$ controlled object position in the current formation. $Q_i(x)$ is also a function established in an n-dimensional space, so the independent variable x has n components, $x^j$ represents the $j^{th}$ component of x, x is a formal parameter, for example, f(x)=x+1 commonly represents a function of x, where x is a formal parameter, then f(y)=y+1, and the meaning of the function f is invariant regardless of the letter with which the formal parameter is replaced.

In the present embodiment, the specific manner of decreasing the cross entropy of P(x) and Q(x) by adjusting the position of the controlled objects in the unmanned device cluster in the step 4 includes:

A gradient descent model is obtained, the gradient descent model is:

$$Y_i = Y_i - \gamma \frac{\partial E}{\partial Y_i}.$$

$$\frac{\partial E}{\partial Y_i} = -\mathbb{E}_{x \sim P}\left[\frac{1}{NQ(X)}\frac{\partial Q_i(X)}{\partial Y_i}\right],$$

since this expected analytical solution is difficult to solve, the Monte Carlo method is used to calculate and sample M times in a random variable with P(x) as the probability density function to obtain a sample $[X_m]$, m=1, 2, . . . , M, and therefore, $$\frac{\partial E}{\partial Y_i} = \frac{1}{M}\sum_{m=1}^{M}\frac{1}{NQ(X_m)}\frac{\partial Q_i(X_m)}{\partial Y_i}.$$

The cross entropy is $E=-\int_\Omega P(x)\ln[Q(x)]dx$, $\Omega=[(x^1, \ldots, x^n)|x^1, \ldots, x^n \in (-\infty, +\infty)]$.

The position of the controlled objects is updated by using the gradient descent model:

$$\frac{\partial E}{\partial Y_i} = -\int_\Omega P(x)\frac{\partial \ln[Q(x)]}{\partial Y^j}dx = -\int_\Omega P(x)\frac{1}{NQ(x)}\frac{\partial Q_i(x)}{\partial Y_i}dx =$$
$$-\mathbb{E}_{x \sim P}\left[\frac{1}{NQ(X)}\frac{\partial Q_i(X)}{\partial Y_i}\right]Q_i(x) = \frac{1}{(\sqrt{2\pi})^n \sigma^n}\exp\left[-\frac{1}{2}\sum_{j=1}^{n}\left(\frac{Y_i^j - x^j}{\sigma}\right)^2\right],$$

$\mathbb{E}$ represents a calculated expected value, and each time the position of the controlled objects is updated, the controlled object located at $Y_i$ is moved to $$Y_i - Y\frac{\partial E}{\partial Y_i},$$

$\gamma$ is used to represent the rate of movement, and $\gamma$ is a constant greater than 0.

Further, $\sigma$ is attenuated before each repeated execution of the step 3. Since the algorithm used in the present embodiment is similar to optimization, an initial value of the parameter $\sigma$ should be taken large enough to avoid trapping in a local optimal solution, and in order to speed up convergence, may be attenuated over time as the task progresses.

In a preferred solution, $\sigma$=10 in an initial state, i.e. $\sigma$=10 at the first execution of the step 3.

At present, most of the existing formation reconstruction algorithms are based on a Leader-Follower mode, one leader needs to be determined in all the controlled objects, and other individuals serve as followers to follow the leader in some way, which includes:

(1) in a distance way: each follower is kept at a certain distance from the leader and adjacent individuals so as to achieve the purpose of formation reconstruction and maintenance;

(2) in a relative position way: the position of each follower relative to the leader reaches a control target so as to achieve the purpose of formation reconstruction and maintenance; and (3) in an event-driven way: the space around the leader is divided into a plurality of areas, a partition surface of the follower traversing area is transmitted to a controller as events, and then the controller generates control instructions according to the events to enable the follower to reach and keep in a designated area.

However, the existing algorithms do not consider the characteristics that any two individuals are interchanged and their formation is unchanged for a cluster composed of the same individuals, thus increasing the calculation complexity. Furthermore, a path needs to be re-planned if the current formation is disturbed due to external interference in the task execution process.

Figure 1:
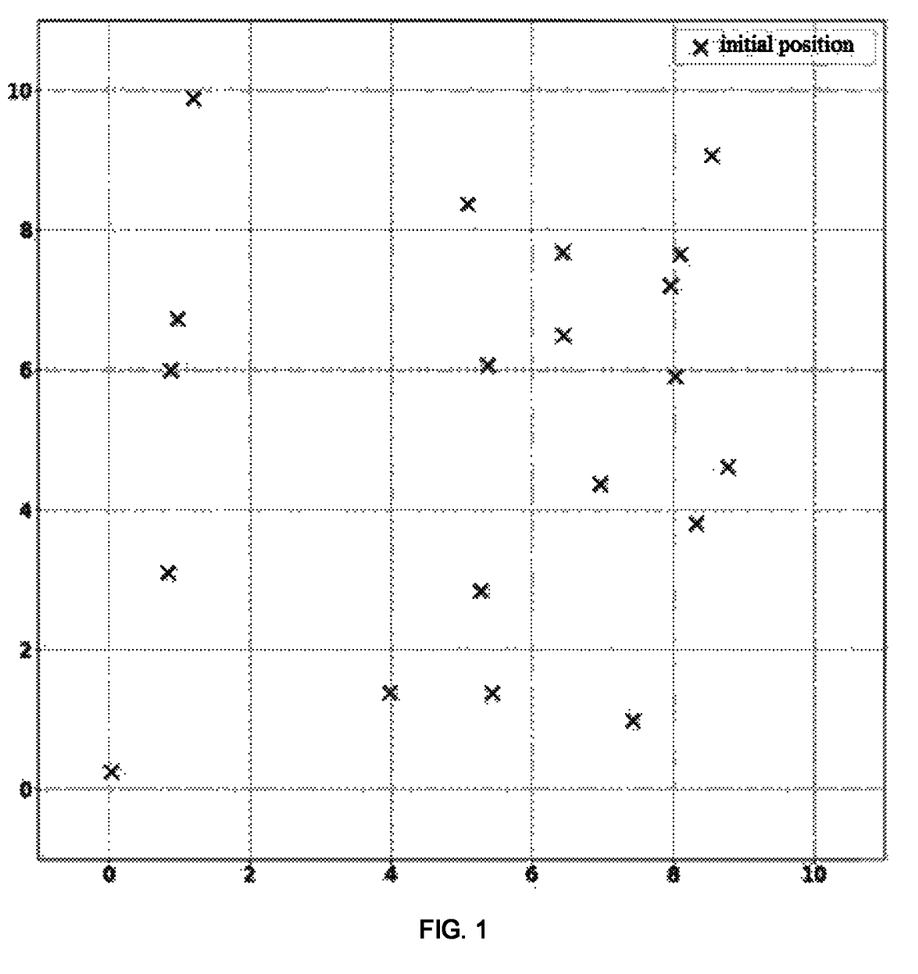
FIG. 1 is a schematic diagram of a target formation provided in an embodiment of the present invention.

The solution provided by the present embodiment can effectively solve the foregoing problem, for example:

In the schematic diagram of a target formation as shown in FIG. 1, an unmanned aerial vehicle cluster composed by 20 controlled objects is reconstructed into an S-shaped queue from any initial position.

In step 1, a set $[X_i]$ of coordinates of all points in the S-shaped queue is obtained:

$$\left\{\left(5 + 2\cos\left(\frac{2\pi}{20}n\right), 6 + 2\sin\left(\frac{2\pi}{20}n\right)\right) \mid n = 6, \ldots, 15\right\}$$
$$u\left\{\left(5 + 2\cos\left(\frac{2\pi}{20}n\right), 2 + 2\sin\left(\frac{2\pi}{20}n\right)\right) \mid n = 15, \ldots, 24\right\}$$

In step 2, let $$P(x) = \frac{1}{20}\sum_{i=1}^{20}P_i(x),$$

wherein $$P_i(x) = \frac{1}{\left(\sqrt{2\pi}\right)^2 \sigma^2} \exp\left[-\frac{1}{2}\sum_{j=1}^{2}\left(\frac{X_i^j - x^j}{\sigma}\right)^2\right].$$

Figure 2:
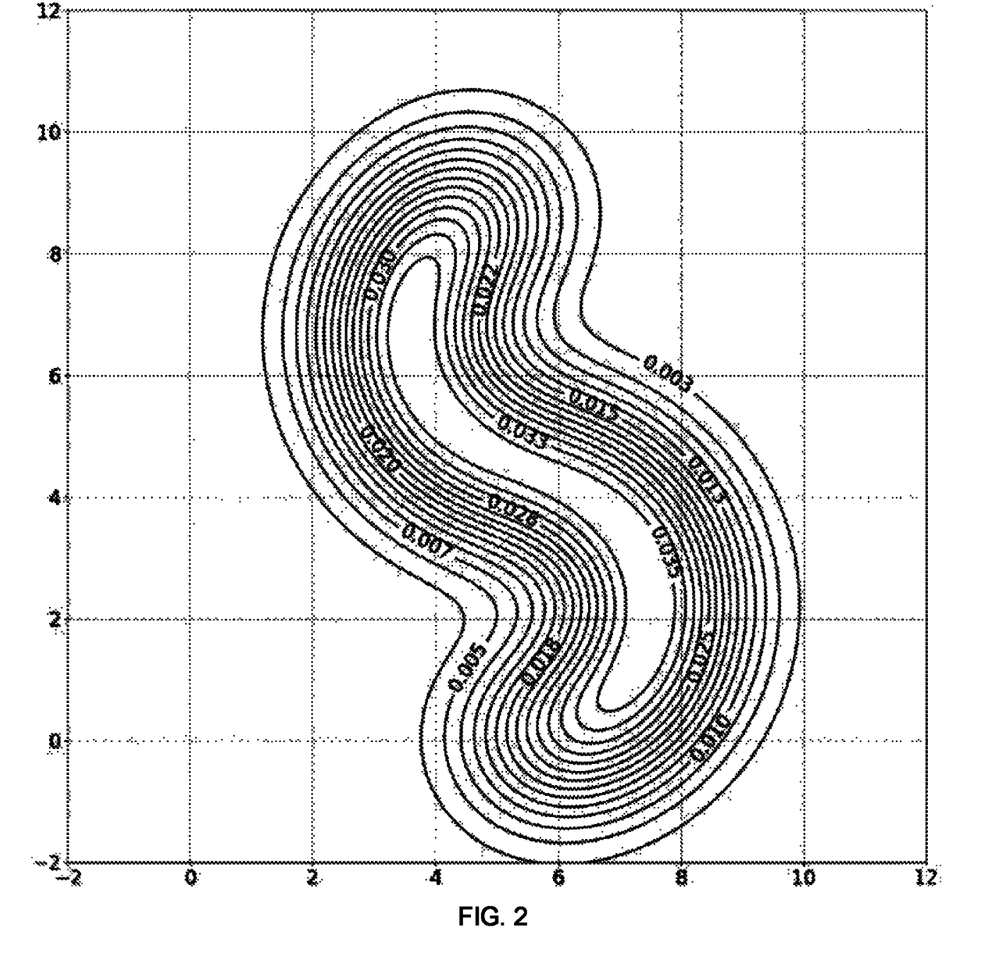
FIG. 2 is a contour plot of a probability density function associated with a target formation provided in an embodiment of the present invention.

The calculation result of P(x) may be referred to a contour plot of a probability density function associated with a target formation as shown in FIG. 2.

In step 3, the current formation of all the controlled objects is obtained and represented by set $[Y_i]$, wherein $Y_i = [Y_i^j]$, and a probability density function Q(x) associated with the current formation of all the controlled objects is established;

$$Q(x) = \frac{1}{20}\sum_{i=1}^{20} Q_i(x),$$

wherein $Q_i(x)$ is a multivariate normal distribution with $Y_i$ as the mean value and $\sigma$ as a standard deviation, i.e.:

$$Q_i(x) \frac{1}{\left(\sqrt{2\pi}\right)^2 \sigma^2} \exp\left[-\frac{1}{2}\sum_{j=1}^{2}\left(\frac{Y_i^j - x^j}{\sigma}\right)^2\right]$$

where $\sigma = 10$.

Figure 3:
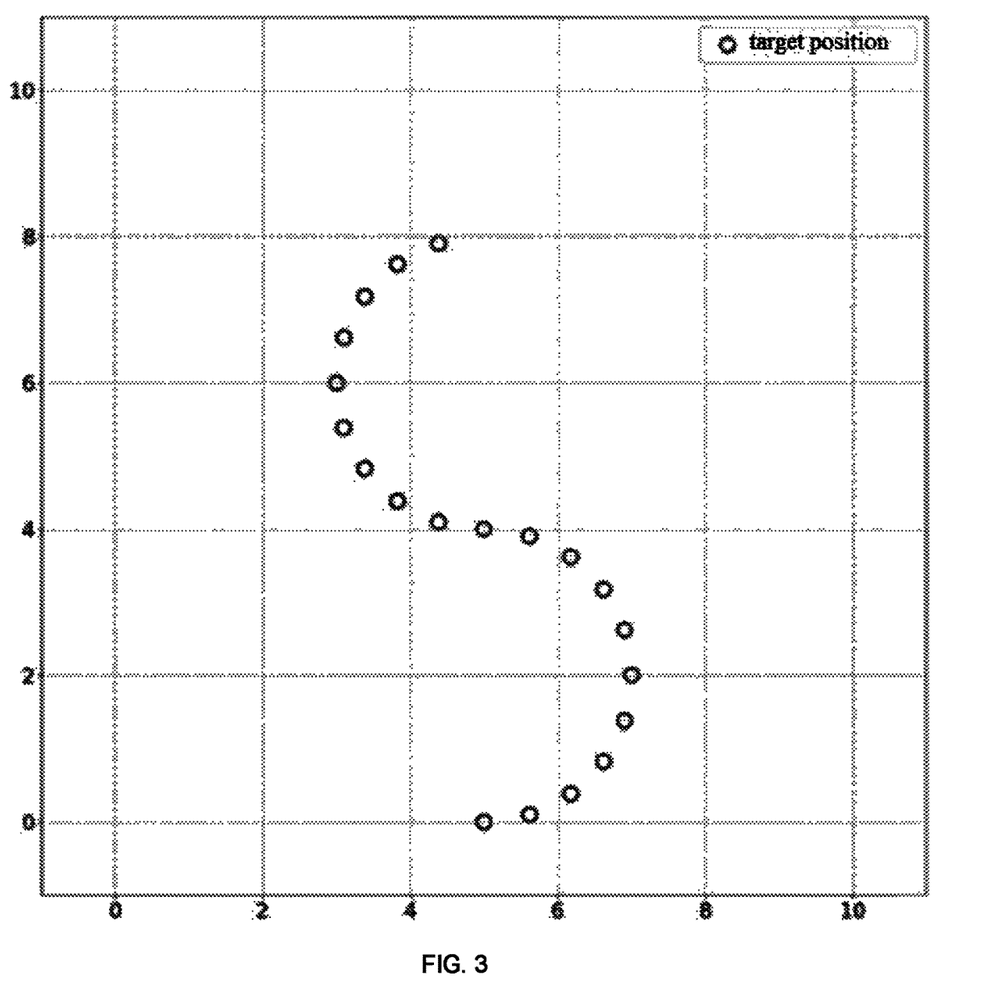
FIG. 3 is a schematic diagram of a current formation of controlled objects provided in an embodiment of the present invention.
Figure 4:
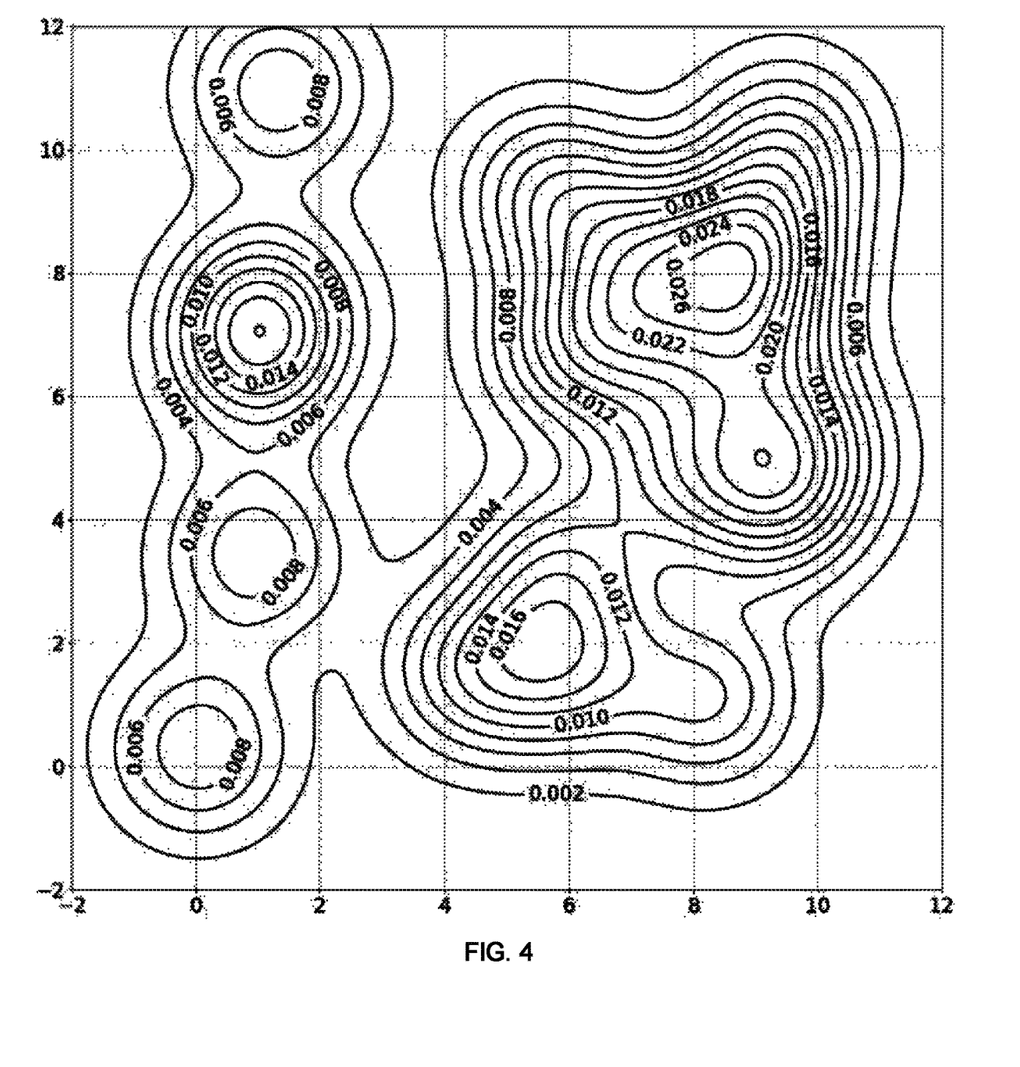
FIG. 4 is a contour plot of a probability density function associated with a current formation provided in an embodiment of the present invention.

The calculation result may be referred to a contour plot of a probability density function associated with a current formation as shown in FIG. 4, and the current formation of the controlled objects may be referred to FIG. 3.

In step 4, a cross entropy of P and Q is decreased by adjusting the position of all the controlled objects, and the method for calculating the cross entropy includes:

$E = -\int_\Omega P(x)\ln[Q(x)]dx$

The position of the controlled objects is adjusted through a gradient descent method, i.e. the position of the controlled objects is updated by the following formula:

$$Y_i = Y_i - 0.1\frac{\partial E}{\partial Y_i}$$

$$\frac{\partial E}{\partial Y_i} = -\mathbb{E}_{X \sim P}\left[\frac{1}{20 Q(X)}\frac{\partial Q_i(X)}{\partial Y_i}\right],$$

since this expected analytical solution is difficult to solve, the Monte Carlo method is used to calculate and sample 2048 times in a random variable with P(x) as the probability density function. The method for each sampling includes: firstly, randomly selecting a number, denoted as i, in a set $\{1, 2, \ldots, 20\}$, and then performing sampling once in a random variable with $P_i(x)$ as the probability density function to obtain a sample $[X_m]$, $m = 1, 2, \ldots, 2048$, and therefore, $$\frac{\partial E}{\partial Y_i} = \frac{1}{2048}\sum_{m=1}^{2048}\frac{1}{20 Q(X_m)}\frac{\partial Q_i(X_m)}{\partial Y_i}.$$

Figure 5:
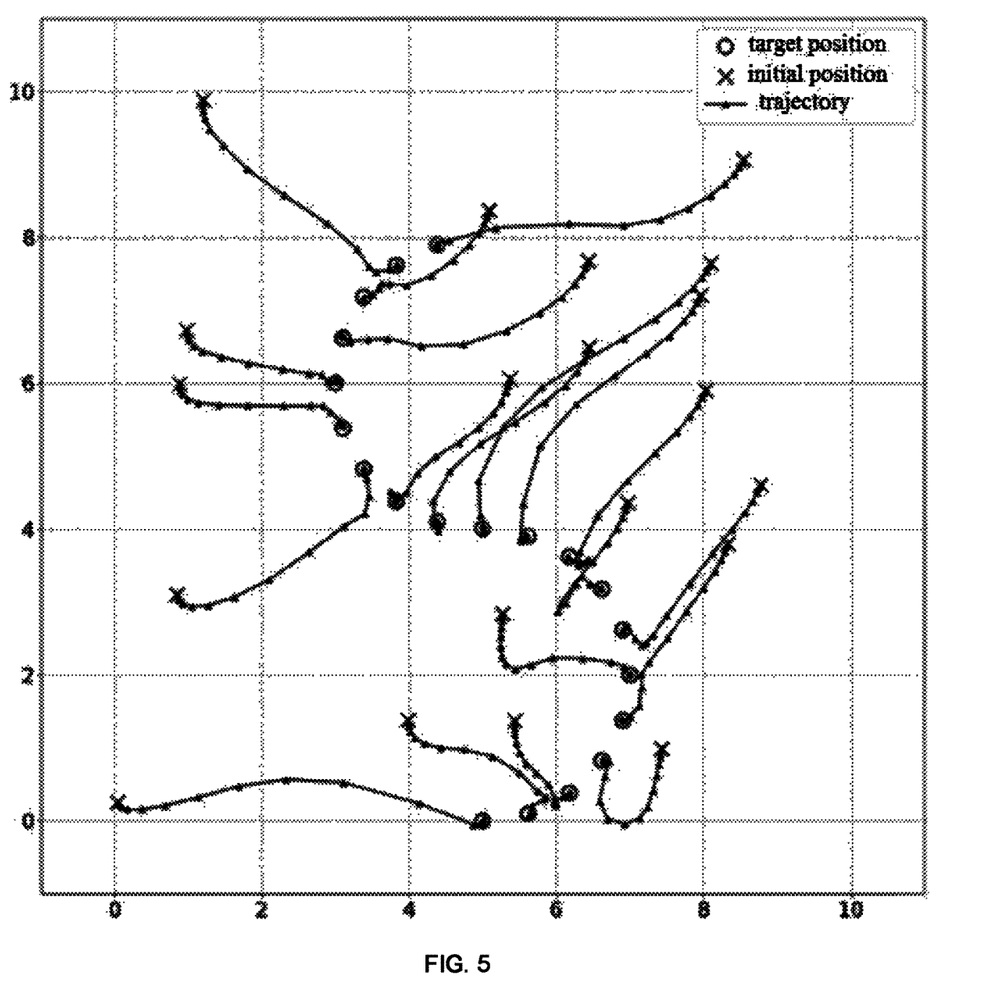
FIG. 5 is a schematic diagram of a moving trajectory of controlled objects provided in an embodiment of the present invention.

The steps 3-4 are executed repeatedly, and then let $\sigma = 0.9.95\sigma$ until the cross entropy reaches a minimum value. A moving trajectory of the controlled objects may be referred to FIG. 5.

When the value of $\sigma$ is large enough, no collision occurs among the controlled objects in the task execution process, and the reasons are as follows:

Assuming that $Y_i$ and $Y_j$ are the positions of two different controlled objects, the square of the distance between $Y_i$ and $Y_j$ is $d^2 = (Y_i - Y_j)(Y_i - Y_j)^T$, and then $$\frac{\partial d^s}{\partial t} = 2(Y_i - Y_j)\left(\frac{\partial Y_i}{\partial t} - \frac{\partial Y_j}{\partial t}\right)^T \infty (Y_i - Y_j)\left(\frac{\partial E}{\partial Y_i} - \frac{\partial E}{\partial Y_j}\right)^T, \text{ since: }\frac{\partial E}{\partial Y_i}\infty$$

$$\sum_{m=1}^{2048}(Y_i - X_m)\exp\left[-\frac{(Y_i - X_m)^2}{2\sigma^2}\right]\frac{\partial E}{\partial Y_j}\infty\sum_{m=1}^{2048}(Y_j - X_m)\exp\left[-\frac{(Y_j - X_m)^2}{2\sigma^2}\right]$$

When $\sigma \to +\infty$, $$\exp\left[-\frac{(Y_i - X_m)^2}{2\sigma^2}\right] = \exp\left[-\frac{(Y_j - X_m)^2}{2\sigma^2}\right],$$

since $(Y_i - X_m) \neq (Y_j - X_m)$, $$\lim_{\sigma \to +\infty}\left(\frac{\partial E}{\partial Y_i} - \frac{\partial E}{\partial Y_j}\right) \neq 0,$$

and since $$\frac{\partial E}{\partial Y_i} - \frac{\partial E}{\partial Y_j}$$

is continuous with respect to $\sigma$, there is $s \in (0, +\infty)$ such that $$(Y_i - Y_j)\left(\frac{\partial E}{\partial Y_i} - \frac{\partial E}{\partial Y_j}\right)^T \neq 0$$

when $\sigma > s$. Also since $$\frac{\partial d^2}{\partial_t}$$

is continuous with respect to time $$t, \frac{\partial d^2}{\partial_t} \neq 0$$

in the task execution process, i.e.

$$\frac{\partial d^2}{\partial_t}$$

is always greater than 0 or always less than 0 in the task execution process, so $d^2$ is monotonous with respect to time t, and no collision occurs in the task execution process when the minimum value of d² occurs at the beginning of the task or at the end of the task.

According to the multi-body formation reconstruction algorithm provided by the present embodiment, flight is calculated and a flight formation of a cluster is adjusted in real time, a one-to-one correspondence relationship between the position in the formation and controlled objects is not required to be established in advance, path planning is not required to be carried out in advance, the controlled objects are not required to be divided into a leader and followers, and no collision occurs when each individual moves according to an instruction generated by the algorithm.

Each embodiment in this description is described in a progressive manner, with like parts being referred to each other, and with emphasis on differences from the other embodiments. In particular, for the device embodiment, which is substantially similar to the method embodiment, the description is relatively simple, and the related parts may be referred to the partial description of the method embodiment. The above are only specific implementations of the present invention, but the protection scope of the present invention is not limited to this. Any person skilled in the art can easily think of changes or substitutions within the technical scope disclosed by the present invention. All the changes or substitutions should be covered within the protection scope of the present invention. Therefore, the protection scope of the present invention should be subject to the protection scope of the claims.

The invention claimed is:

1. A multi-body formation reconstruction method for an unmanned device cluster control, comprising:
   Step 1: reading a preset target formation, the target formation being a set composed by coordinates of a specified number of points, the specified number being matched with the number of unmanned devices in the unmanned device cluster;
   Step 2: establishing a probability density function P(x) associated with the target formation;
   Step 3: obtaining the current formation of all the controlled objects in the unmanned device cluster, and establishing a probability density function Q(x) associated with the current formation;
   Step 4: decreasing a cross entropy of P(x) and Q(x) by adjusting the position of the controlled objects in the unmanned device cluster; and
   repeating executing the step 3 and the step 4 until the formation composed by the controlled objects in the unmanned device cluster is consistent with the target formation,
wherein reading the preset target formation comprises:
   obtaining a set $[X_i]$ of coordinates of respective points in the target formation;
   wherein elements in $[X_i]$ represent target positions of the respective points in the target formation, $i=1, 2, \ldots, N$, the points in the target formation are represented as $X_i=[X^j_i]$ represents the $j^{th}$ component of the coordinate of the $i^{th}$ target position, $j=1, \ldots, n$, n represents the dimensions of a space where the target formation is located, and n has a value of 2 or 3,
wherein establishing the probability density function P(x) associated with the target formation comprises:
   determining a multivariate normal distribution $P_i(x)$ with $X_i$ as the mean value, wherein $$P_i(x) = \frac{1}{(\sqrt{2\pi})^n \sigma^n} \exp\left[-\frac{1}{2}\sum_{j=1}^{n}\left(\frac{x^j_i - x^j}{\sigma}\right)^2\right];$$

establishing the probability density function P(x) associated with the target formation, wherein $$P(x) = \frac{1}{N}\sum_{i=1}^{N} P_i(x), x = \{x^j\}, j = 1, \ldots, n,$$

$j=1, \ldots, n$, N represents the number of the controlled objects, and σ represents a standard deviation of the normal distribution,
wherein establishing the probability density function Q(x) associated with the current formation comprises:
   obtaining a set $[Y_i]$ of coordinates of all the controlled objects in the current formation, wherein $Y_i=[Y^j_i]$ and $Y^j_i$ represents the $j^{th}$ component of the coordinate of the $i^{th}$ controlled object position in the current formation;
   determining a multivariate normal distribution $Q_i(x)$ with $Y^j_i$ as the mean value, wherein $$Q_i(x) = \frac{1}{(\sqrt{2\pi})^n \sigma^n} \exp\left[-\frac{1}{2}\sum_{j=1}^{n}\left(\frac{Y^j_i - x^j}{\sigma}\right)^2\right];$$

establishing the probability density function Q(x) associated with the current formation, wherein $$Q(x) = \frac{1}{N}\sum_{i=1}^{N} Q_i(x), x = \{x^j\}, j = 1, \ldots n,$$

$j=1, \ldots, n$, N represents the number of the controlled objects, and σ represents a standard deviation of the normal distribution,
wherein decreasing the cross entropy of P(x) and Q(x) by adjusting the position of the controlled objects in the unmanned device cluster comprises:
   obtaining a gradient descent model, the gradient descent model being:

$$Y_i = Y_i - \gamma\frac{\partial E}{\partial Y_i}, \text{ wherein } \frac{\partial E}{\partial Y_i} = -E_{x \sim p}\left[\frac{1}{NQ(X)}\frac{\partial Q_i(X)}{\partial Y_i}\right],$$

$$\frac{\partial E}{\partial Y_i} = \frac{1}{M}\sum_{m=1}^{M}\frac{1}{NQ(X_m)}\frac{\partial Q_i(X_m)}{\partial Y_i},$$

the cross entropy is $E = -\int_\Omega P(x)\ln[Q(x)]dx$, $\Omega=[(x^1, \ldots, x^n)|x^1, \ldots, x^n \in (-\infty, +\infty)]$; and
   updating the position of the controlled objects by using the gradient descent model:

$$\frac{\partial E}{\partial Y_i} = -\int_\Omega P(x)\frac{\partial \ln[Q(x)]}{\partial Y^j}dx =$$

$$-\int_\Omega P(x)\frac{1}{NQ(x)}\frac{\partial Q_i(x)}{\partial Y_i}dx = -E_{x \sim p}\left[\frac{1}{NQ(X)}\frac{\partial Q_i(X)}{\partial Y_i}\right]$$

where $$Q_i(x) = \frac{1}{(\sqrt{2\pi})n_\sigma n} \exp\left[-\frac{1}{2}\sum_{j=1}^{n}\left(\frac{Y_i^j - x^j}{\sigma}\right)^2\right],$$

IE represents a calculated expected value, and each time the position of the controlled objects is updated, the controlled object located at $Y_i$ is moved to $$Y_i - Y\frac{\partial E}{\partial Y_i},$$

y is used to represent the rate of movement, and y is a constant greater than 0.

2. The method according to claim 1, wherein $\sigma$ is attenuated before each repeated execution of the step 3.

3. The method according to claim 2, wherein $\sigma=10$ at the first execution of the step 3.

* * * * *